United States Patent [19]
Goh

[11] Patent Number: 5,678,015
[45] Date of Patent: Oct. 14, 1997

[54] FOUR-DIMENSIONAL GRAPHICAL USER INTERFACE

[75] Inventor: Eng Lim Goh, Teresa Ville, Singapore

[73] Assignee: Silicon Graphics, Inc., Mountain View, Calif.

[21] Appl. No.: 522,953

[22] Filed: Sep. 1, 1995

[51] Int. Cl.⁶ .................................................. G06F 3/00
[52] U.S. Cl. .......................... 395/355; 395/130; 395/340; 395/119
[58] Field of Search ................ 395/119–127, 130, 395/129, 137, 326–358; 345/117–120, 126; 382/285

[56] References Cited

U.S. PATENT DOCUMENTS

| | | | |
|---|---|---|---|
| 5,072,412 | 12/1991 | Henderson, Jr. et al. | 395/346 |
| 5,107,443 | 4/1992 | Smith et al. | 395/331 |
| 5,148,154 | 9/1992 | MacKay et al. | 340/119 |
| 5,226,109 | 7/1993 | Dawson et al. | 395/120 |
| 5,264,836 | 11/1993 | Rubin | 395/355 |
| 5,303,388 | 4/1994 | Kreitman et al. | 395/355 |
| 5,313,646 | 5/1994 | Hendricks et al. | 395/331 X |
| 5,333,255 | 7/1994 | Damouth | 395/344 X |
| 5,339,390 | 8/1994 | Robertson et al. | 395/342 |
| 5,365,360 | 11/1994 | Torres | 395/348 |
| 5,381,158 | 1/1995 | Takahara et al. | 395/355 X |
| 5,485,197 | 1/1996 | Hoarty | 395/355 X |
| 5,515,486 | 5/1996 | Amro et al. | 395/355 |
| 5,555,354 | 9/1996 | Strasnick et al. | 395/127 |

OTHER PUBLICATIONS

Foley, "Computer Graphics: Principles and Practice", 2nd. ed., Addison–Wesley Pub. Co., pp. 741–745 Nov. 1993.

*Primary Examiner*—John E. Breene
*Attorney, Agent, or Firm*—Sterne, Kessler, Goldstein & Fox P.L.L.C.

[57] ABSTRACT

A computer-based system and method for displaying a workspace of greater effective area than that of the display screen using a four-dimensional graphical user interface employing real-time texture mapping. According to the present invention, the user selects a number of workspaces to be displayed. Each selected workspaces is then texture mapped to a polygonal surface. Then the surfaces are displayed at orientations to form a polyhedron with a workspace on each face. Each face may be translucent, so that workspaces otherwise hidden by that face are visible. The polyhedron rotates under the user's control so that each face is presented to the user. It is this combination of a three-dimensional figure with real-time rotation and texture mapping that gives this "Four-Dimensional Graphical User Interface" its name.

18 Claims, 5 Drawing Sheets

FOUR-DIMENSIONAL GRAPHICAL USER INTERFACE

BACKGROUND OF THE INVENTION

1. Field of the Invention

The present invention relates generally to graphical user interfaces (GUI) for computer systems, and more particularly to computer system GUIs that permit the user to utilize a workspace of greater effective area than that permitted by the size of the display screen.

2. Related Art

In a typical computer system, the user interacts with the system via various input devices, such as a keyboard and mouse, and various output devices, usually a video display terminal having a screen for displaying images and text to the user. In operation, the computer system executes a computer program called the "operating system," which allows other programs and the user to control the computer system. The portion of the operating system that allows the user to control the computer system is called the "user interface." The various schemes for implementing the interface are generally categorized by the manner in which the user interacts with the system. For example, in a typical character user interface (ChUI) such as DOS®, the user inputs text from the keyboard, and the system returns text to the screen. However, in a graphical user interface (GUI) such as Windows®, the user can interact with the system by manipulating graphical objects on the display screen.

The display of a typical GUI comprises at least one "window" (a framed user workspace which can be manipulated independently of that portion of the display screen outside the frame) containing a number of objects (hereinafter called "icons") which represent various commands, applications, and the like. While the typical GUI display consists of two-dimensional objects such as the above-described windows and icons, a number of user interfaces have been developed which employ three-dimensional constructs.

One such construct, disclosed in U.S. Pat. No. 5,303,388, is a three-dimensional icon where the faces of the icon can display information regarding the properties of the object represented by the icon. The user can view hidden faces of the icon by manipulating the icon using the mouse or keyboard. In one embodiment, the icon may represent a file folder containing objects that may be displayed on a translucent face of the icon. The user may select a particular object, open a document associated with an object, or move an object in or out of the file folder.

Another such construct, disclosed in U.S. Pat. No. 5,148,154, is a user interface for use in audio-visual production which permits multiple views of a conceptual three-dimensional object. The conceptual object is essentially a three-dimensional bar chart depicted as a set of elongated three-dimensional boxes disposed in parallel upon a plane. The user may select one of only six views of the object where one face of a box is orthogonal to the user's line of sight. Consequently, the user can never view more than one side of any box in one view. While the user can look at multiple views simultaneously, he cannot view the conceptual object in perspective.

Another such construct, disclosed in U.S. Pat. No. 5,339,390, is a "streched" wokspace that enables the user to view a portion of the workspace in greater detail. The workspace is divided into a left, right, and center section, where the center section is orthogonal to the user's line of sight and the left and right sections appear to extend away from the user at an angle. The user may "stretch" the center section, resulting in a corresponding compression of the left and right sections, to view the central portion of the workspace in greater detail.

Returning to a typical GUI, when the user "opens" the icon (e.g., in Windows®, by "double-clicking" the mouse button while the cursor is positioned on the icon), the command represented by the icon is executed. Generally, an icon represents an application, which is launched when the command is executed. As a user adds more applications to the desktop more icons are required. At some point, the number of icons exceeds the available display space. In response, a number of strategies have been implemented.

One such strategy is to provide "scrollable" windows. In this scheme, the workspace is larger than its window, so only a portion of the workspace is visible at any given time. Horizontal and/or vertical "scroll bars" are provided to "scroll" the workspace past the window, thereby enabling the user to look at different portions of the workspace.

Another such strategy is to provide multiple windows, each containing a portion of the total set of icons. The user may view different icons by selecting different windows. But because the windows must overlap, the user can see only a portion of the total set of icons at any given time.

The drawback to all of the prior schemes is that only a portion of the total set of icons is visible at any given time. What is needed is a method to permit the user to view a large number of icons simultaneously.

SUMMARY OF THE INVENTION

The present invention is a system and method for displaying a workspace of greater effective area than that of the display screen using a four-dimensional graphical user interface. According to a preferred embodiment of the present invention, up to six workspaces may be displayed simultaneously, one on each side of a rotating cube. The workspaces are translucent so that all six workspaces are visible to the user simultaneously. It is this combination of a three-dimensional figure with real-time rotation that gives this "Four-Dimensional Graphical User Interface" its name.

The present invention is a computer system having a graphical user interface (CUD system for simultaneously displaying a plurality of windows. Th windows are first texture mapped to a number of polygonal surfaces. Then the texture mapped polygonal surfaces are displayed at respective orientations to form a polyhedron. The polyhedron thereby appears to be comprised of a number of faces, each of which is one of the windows. Thus, a user can simultaneously view more than one of the windows.

In a preferred embodiment, the workspaces are operating system windows containing icons which represent applications.

In alternate embodiments, the workspaces are application windows containing text and/or graphics for user manipulation.

One advantage of the present invention is that it permits a user to simultaneously view a larger number of icons than will be possible in a standard two-dimensional window.

Another advantage of the present invention is that it permits a user to view a larger effective workspace than would be possible in a standard two-dimensional window.

Further features and advantages of the present invention as well as the structure and operation of various embodiments of the present invention are described in detail below with reference to the accompanying drawings. In the drawings, like reference numbers indicate identical or functionally similar elements. Additionally, the left-most digit of a reference number identifies the drawing in which the reference number first appears.

DETAILED DESCRIPTION OF THE PREFERRED EMBODIMENTS

The preferred embodiment of the invention is discussed in detail below. While specific steps, configurations and arrangements are discussed, it should be understood that this is done for illustrative purposes only. A person skilled in the relevant art will recognize that other steps, configurations and arrangements can be used without departing from the spirit and scope of the invention.

I. A Typical GUI

A typical configuration for a personal computer system includes a processing unit, a display, a keyboard, and a mouse. The processing unit executes a computer program called the "operating system," which allows the operation of the computer system to be controlled either directly by the user or by other computer programs called "applications." A user operates the computer system by entering commands using the keyboard and mouse; in response, the processing unit executes the commands and presents feedback to the user via the display. The portion of the operating system that accepts user commands and presents feedback to the user is called the "user interface."

The various schemes for implementing the user interface are generally categorized by the manner in which the user interacts with the system. For example, in a typical character user interface (ChUI) such as DOS®, the user inputs text from the keyboard; in response, the computer system returns text messages to the display. However, in a graphical user interface (GUI) such as Windows®, the user can interact with the computer system by manipulating graphical objects on the display screen using the keyboard and/or the mouse.

Figure 1:
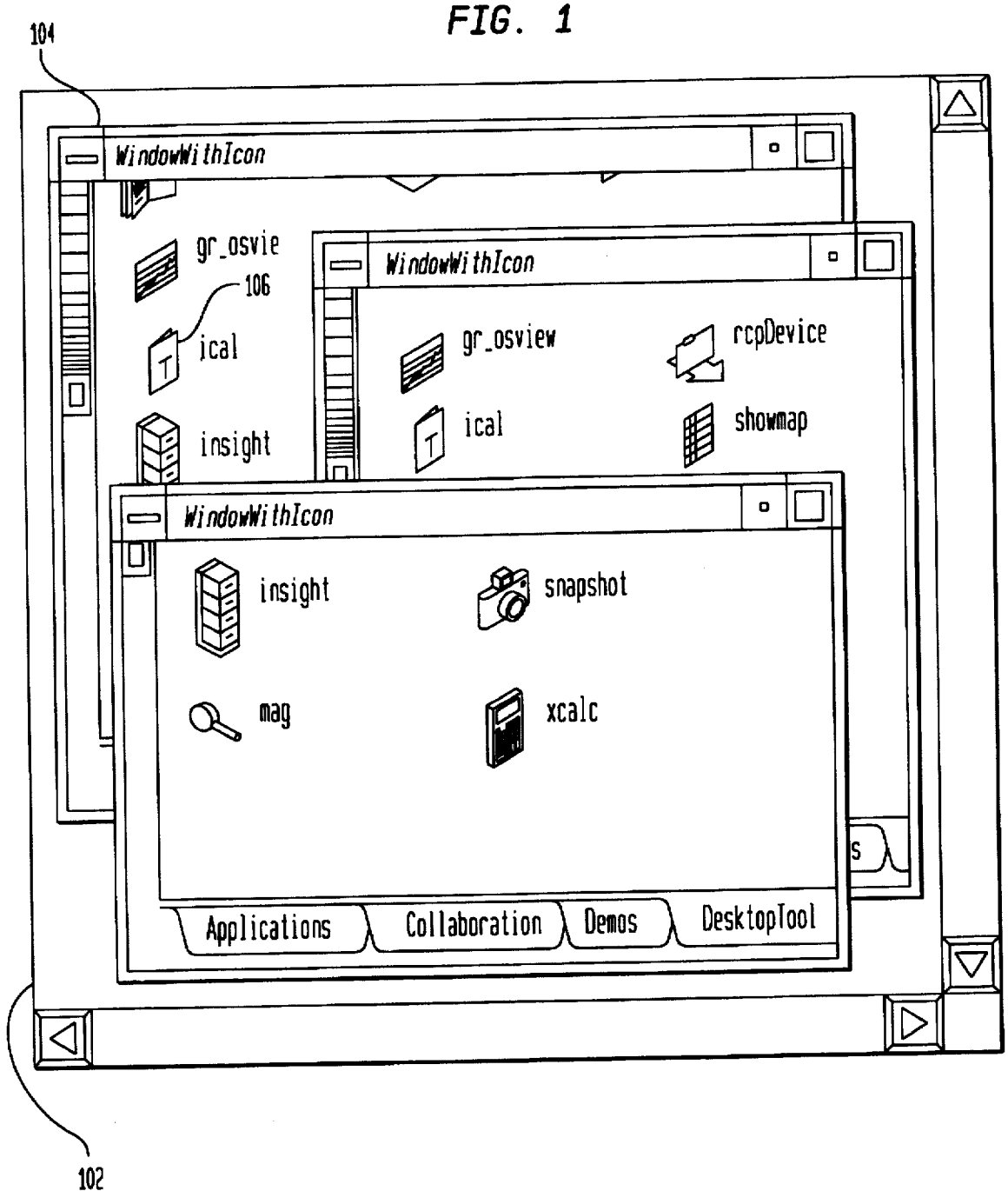
FIG. 1 depicts the display of a typical GUI.

FIG. 1 depicts the display of a typical GUI. The display screen is filled with a background 102 called the "desktop". Superimposed on desktop 102 are a number of rectangular graphical objects 104 called "windows". A window 104 is a framed user workspace which can be manipulated independently of that portion of the display screen outside the frame. For example, a window in a word processing application can contain the text of a document the user is editing, or a window in a drawing application can contain the figure the user is drawing. A window belonging to a computer operating system can contain "icons," which are graphical display objects representing commands, applications, and the like.

Figure 2:
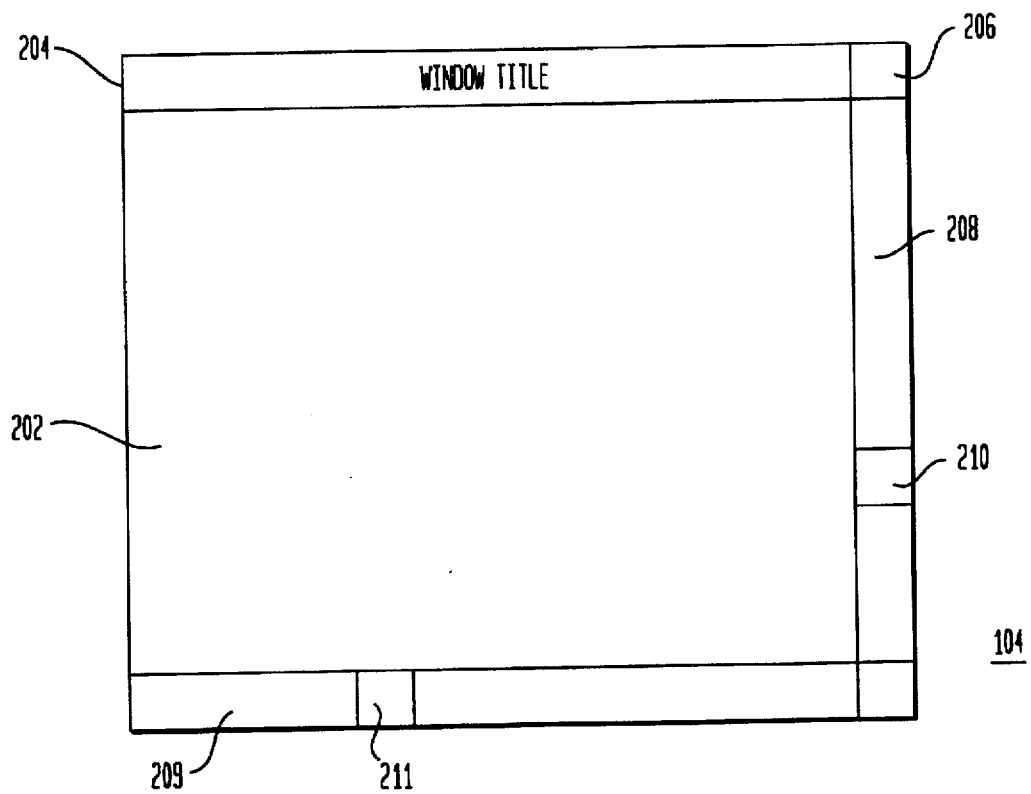
FIG. 2 depicts a typical window.

FIG. 2 depicts a typical window 104. Window 104 comprises a workspace 202, a title bar 204, a resize button 206, horizontal and vertical scroll bars 208, 209 and scroll buttons 210, 211. Workspace 202 is a display area containing graphical representations of the objects, such as icons, that the user is manipulating. Title bar 204 contains the title of the window, and is used for moving the window about the screen of the display. Re-size button 206 is used to change the size of window 104 to display more or less of workspace 202. Scroll bars 208, 209 are displayed whenever, because the size of workspace 202 exceeds the size of window 104, portions of workspace 202 are hidden from view. By manipulating scroll buttons 210, 211, the user can view the hidden portions of workspace 202.

Referring again to FIG. 1, superimposed on desktop 102 are a number of windows 104, each containing a number of icons 106. Typically, each icon 106 represents a command that the user can execute by "double-clicking" on icon 106 using a mouse button. In the preferred embodiment, each icon 106 represents an application, which is launched by executing the command represented by the icon 106. A difficulty that the user experiences with the GUI of FIG. 1 is that not all of the icons 106 are visible simultaneously because the windows 104 overlap. Even if all of the icons 106 were transferred to a single window 104, there are simply more icons 106 than can be displayed simultaneously in the available space on the display. What is needed is a method for viewing all icons 106 simultaneously.

II. A Four-Dimensional GUI

The present invention is a system and method for displaying a workspace of greater effective area than that of the display screen using a four-dimensional graphical user interface. According to a preferred embodiment of the present invention, up to six workspaces may be displayed simultaneously, one on each side of a rotating cube. The workspaces are translucent so that all six workspaces are visible to the user simultaneously.

After reading the following discussion, it will be apparent to a person skilled in the relevant art how other workspaces can be displayed according to the present invention.

Figure 3:
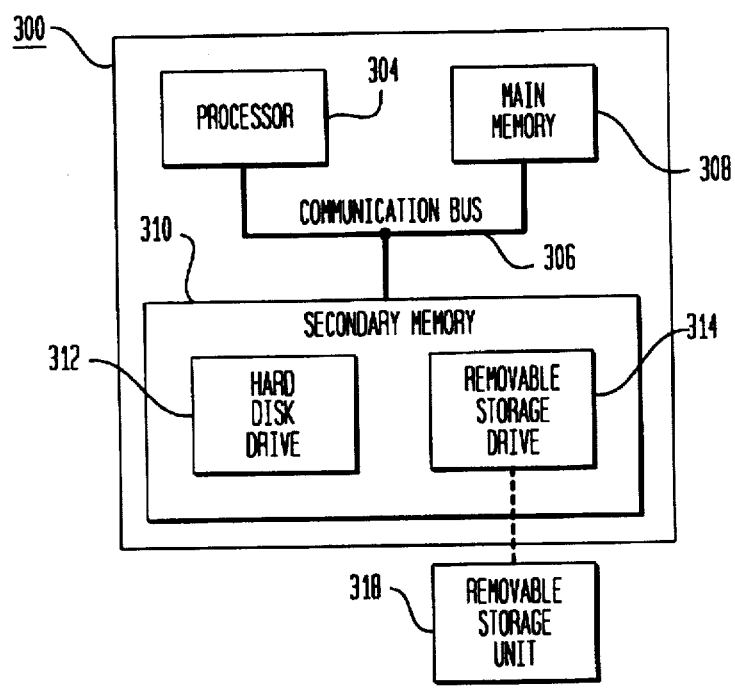
FIG. 3 depicts an exemplary computer system operating according to the present invention.

In one embodiment, the present invention is directed to a computer system operating as discussed herein. An exemplary computer system 300 is shown in FIG. 3. The computer system 300 includes one or more processors, such as processor 304. The processor 304 is connected to a communication bus 306.

The computer system 300 also includes a main memory 308, preferably random access memory (RAM), and a secondary memory 310. The secondary memory 310 can include, for example, a hard disk drive 312 and/or a removable storage drive 314, representing a floppy disk drive; a magnetic tape drive; a compact disk drive, or the like. The removable storage drive 314 reads from and/or writes to a removable storage unit 318 in a well known manner.

Removable storage unit 318, also called a program storage device or a computer program product, represents a floppy disk, magnetic tape, compact disk, or the like. As will be appreciated, the removable storage unit 318 includes a computer usable storage medium having stored therein computer software and/or data.

Computer programs (also called computer control logic) are stored in main memory and/or the secondary memory 310. Such computer programs, when executed, enable the computer system 300 to perform the features of the present invention as discussed herein. In particular, the computer programs, when executed, enable the processor 304 to perform the features of the present invention. Accordingly, such computer programs represent controllers of the computer system 300.

In another embodiment, the invention is directed to a computer program product comprising a computer readable medium having control logic (computer software) stored therein. The control logic, when executed by the processor 304, causes the processor 304 to perform the functions of the invention as described herein.

In another embodiment, the invention is implemented primarily in hardware using, for example, a hardware state machine. Implementation of the hardware state machine so as to perform the functions described herein would be apparent to persons skilled in the relevant art.

The present invention is a four-dimensional GUI for displaying a plurality of windows 104 simultaneously. According to the present invention, a polyhedron is first generated and displayed. Then, the user selects one or more windows to be displayed on the faces of the polyhedron. The user may select as many windows as the polyhedron has faces. In the preferred embodiment, the polyhedron is a cube; thus up to six windows 104 may be displayed simultaneously.

Figure 4:
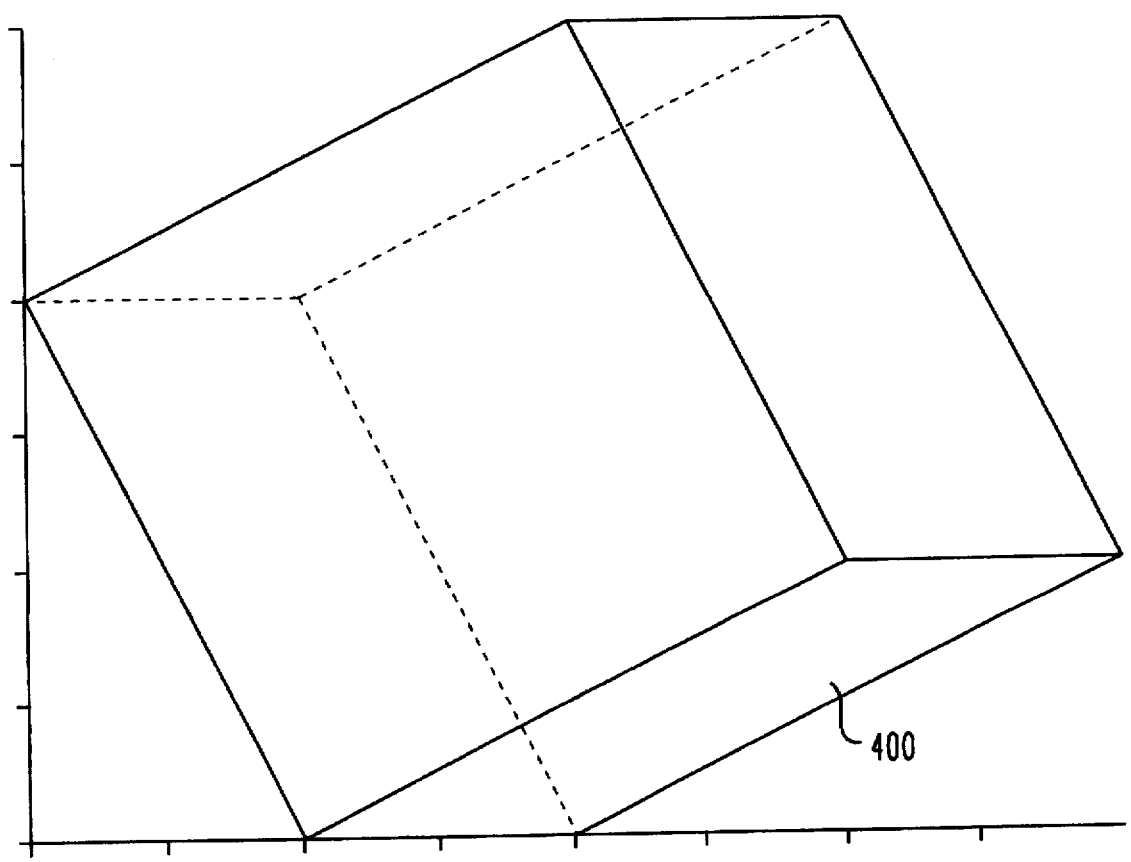
FIG. 4 depicts a display of a cube 400.

One advantage of the present invention is that it permits a user to view a larger effective workspace than would be possible in a standard two-dimensional window. Now, this is demonstrated by example with reference to FIG. 4. FIG. 4 depicts a display of a cube-type polyhedron 400 on a screen with a total surface area of 48 inches. When orthogonal to the viewer's line of sight, each edge of cube 400 measures 4 inches so that each face of cube 400 has an area of 16 inches. Thus cube 400 has a total usable workspace area of 96 inches. Thus, in this example, the total display area of the cube is twice that of the screen.

In a preferred embodiment of the present invention, at least one face of the cube is translucent. This arrangement permits the user to view a greater number of cube faces (i.e., windows) simultaneously. When all six windows are translucent, the user can see all of the icons at once. Icons on faces of the cube which are seen through other faces will appear laterally inverted, i.e. mirrored; this property allows the user to perceive the orientation of the cube. When a user selects a window, it becomes opaque for ease of viewing.

In a preferred embodiment of the present invention, the cube can rotate in any one of at least three modes: (1) the cube may rotate constantly, (2) the cube may rotate under the user's control, or (3) both. The cube has a default rotation pattern such that each face of the cube is displayed as normal to the user's line of sight once during each rotation cycle. However, the rotation speed and pattern may be controlled by the user via the keyboard and the mouse.

In a preferred embodiment of the present invention, the windows are applied to the faces of the cube by a process known as "texture mapping," which is the application of an image to the surface of a displayed object. When the cube is rotating, the texture mapping must be executed in real time. Such real-time texture mapping is possible using a workstation computer system such as the Silicon Graphics Onyx® or using a personal computer system such as the Silicon Graphics Indigo II Impact®. It is this combination of a three-dimensional figure with real-time rotation and texture mapping that gives this "Four-Dimensional Graphical User Interface" its name.

Figure 5:
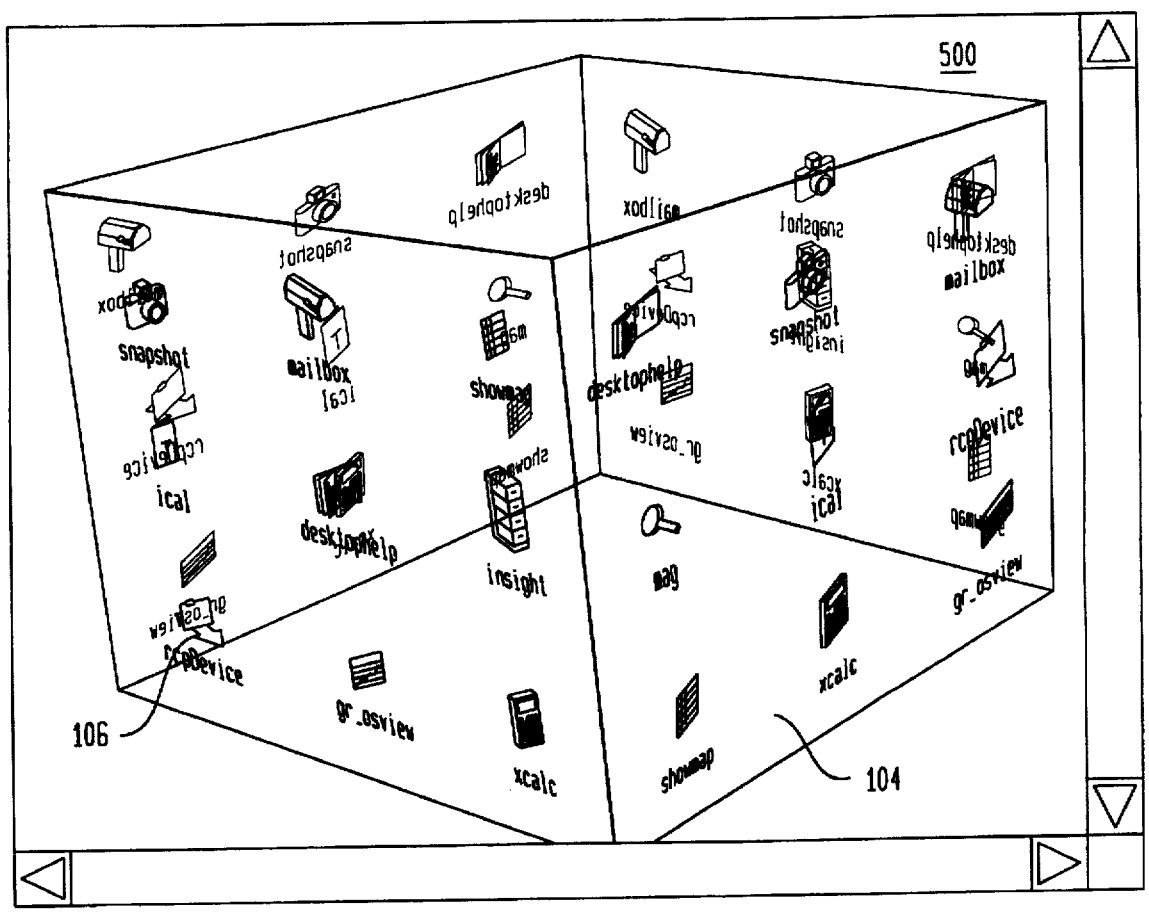
FIG. 5 depicts the display of the four-dimensional GUI of the present invention according to a preferred embodiment.
Figure 6:
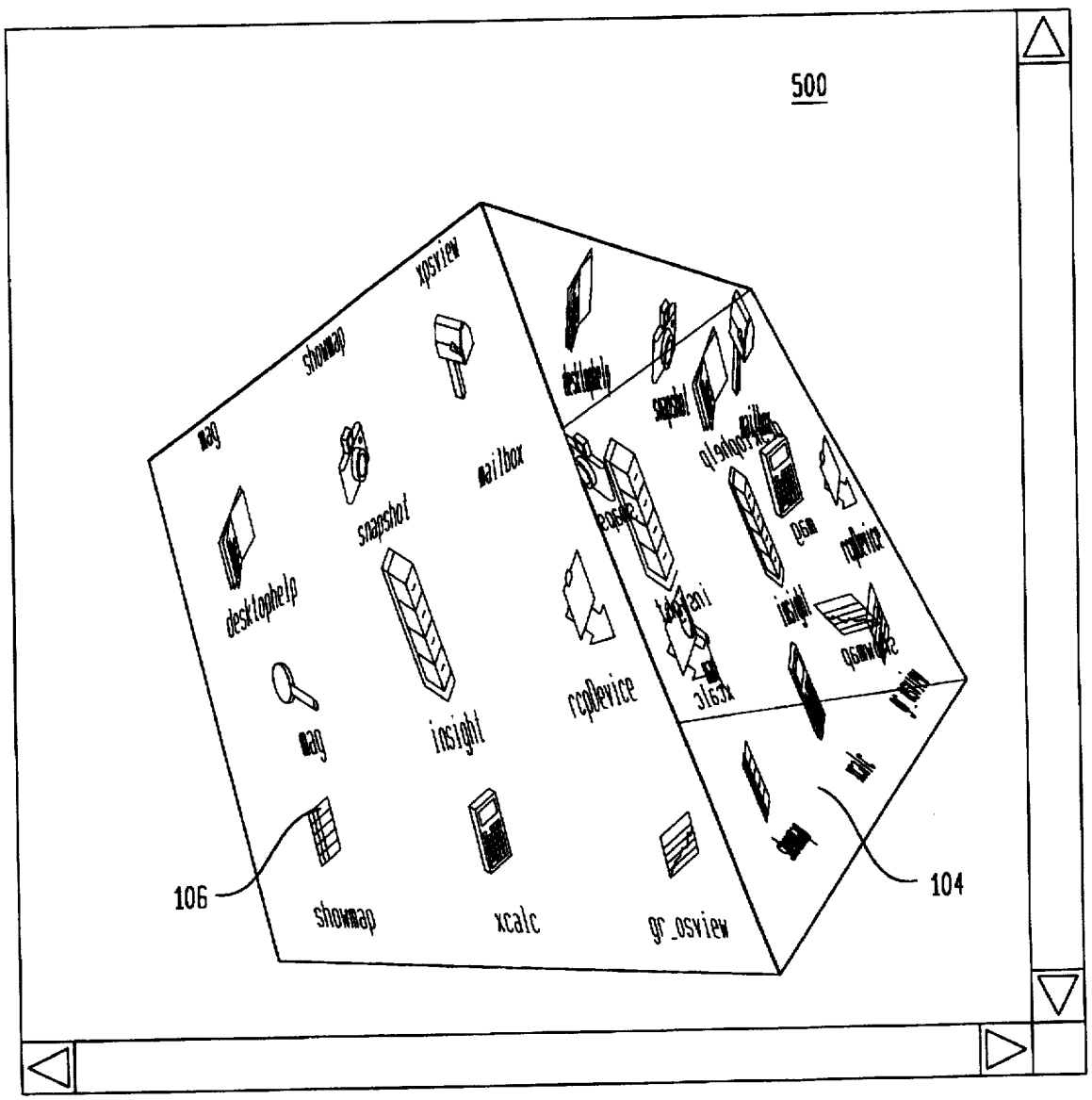
FIG. 6 depicts cube 500 after rotation to a new position.

FIG. 5 depicts the display of the four-dimensional GUI of the present invention according to a preferred embodiment. A cube 500 is displayed. Six different windows 104 have been texture mapped onto cube 500, one window 104 per face. Each window 104 contains a plurality of icons 106. The windows 104 are translucent so that icons 106 in windows on the far side of the cube are visible to the user. One window has been selected by the user; it is therefore opaque. FIG. 6 depicts cube 500 after rotation to a new position. The user may select icons 106, add or delete icons 106, or launch the applications represented by icons 106.

In an alternate embodiment of the present invention, the windows which are texture-mapped to the faces of the cube are application workspaces. As described above, the workspaces may be translucent, and the cube may rotate automatically, under user control, or both. After reading the above description, it will become apparent to a person skilled in the relevant art how to implement the invention using other alternative embodiments.

A number of further features of the present invention are discussed below. Drop-down menus are provided for the user to access these features. First, when the user decides to view the cube, the user selects the "cube/formation" item from the drop-down menu. In response, the GUI causes the desktop to "fall" away from the user, revealing the cube. The user can select default images so that these images are displayed on the faces of the cube when it is first formed. The user can then select windows to be applied to the faces of the cube. Once one or more windows is mapped onto the cube, the user can select a window. In response, the selected window then becomes opaque. If the user wishes to edit a window, the user can remove a window from the cube and edit it as a standard, two-dimensional window. Once edited, the window can be re-applied to the cube.

The user can select any viewpoint from which to view the cube, even a viewpoint inside the cube. As a result, the cube is scalable. The user can also control the rotation and orientation of the cube. To facilitate orientation, the user may select "axis illumination." In response, illuminated axes, one orthogonal to each face of the cube, are displayed. Control points are provided at regular intervals along the axes for the user to "grab" using the mouse and "drag" to orient the cube. When the user wishes to return to the desktop, the user selects "cube/disband" from the drop-down menu. In response, the cube disappears, the desktop rises to fill the screen, and any windows that were mapped to the cube reappear on the desktop.

As a further feature of the present invention, the user may elect to have more than one cube displayed simultaneously, permitting an even greater number of windows to be displayed. Each cube may be minimized so that it is represented by a small, spinning-cube icon.

III. Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents. All cited patent documents and publications in the above description are incorporated herein by reference.

What is claimed is:

1. A computer system having a graphical user interface (GUI) system for simultaneously displaying a plurality of windows, comprising:

means for texture mapping the windows to a number of polygonal surfaces; and means for displaying said texture mapped polygonal surfaces at respective orientations to form a polyhedron, said polyhedron thereby appearing to be comprised of a number of faces, each of said faces comprising one of the windows, and thereby permitting a user to simultaneously view more than one of the windows.

2. The system of claim 1, where said polyhedron is a cube.

3. The system of claim 1, further comprising means for rotating said polyhedron so that each face is visible to the user.

4. The system of claim 1, further comprising means for rotating said polyhedron in response to user input via said control means.

5. The system of claim 1, wherein at least one of the windows is translucent.

6. The system of claim 1, wherein at least one of the windows is scrollable.

7. A system for displaying a plurality of graphical user interface (GUI) windows simultaneously, comprising:
- a processor; and
- a controller to control said processor, comprising:
  - means for texture mapping the windows to a number of polygonal surfaces; and
  - means for displaying said texture mapped polygonal surfaces at respective orientations to form a polyhedron, said polyhedron thereby appearing to be comprised of a number of faces, each of said faces comprising one of the windows, and thereby permitting a user to simultaneously view more than one of the windows.

8. A controller for displaying a plurality of graphical user interface (GUI) windows simultaneously, comprising:
- means for texture mapping the windows to a number of polygonal surfaces; and
- means for displaying said texture mapped polygonal surfaces at respective orientations to form a polyhedron, said polyhedron thereby appearing to be comprised of a number of faces, each of said faces comprising one of the windows, and thereby permitting a user to simultaneously view more than one of the windows.

9. A computer program product for use with a database and data processing system memory, said computer program product comprising:
- a computer usable medium having computer readable program code means embodied in said medium for displaying a plurality of graphical user interface (GUI) windows simultaneously, said computer readable program code means comprising:
  - a computer readable first program code means for causing a computer to texture map the windows to a number of polygonal surfaces; and
  - a computer readable second program code means for causing the computer to display said texture mapped polygonal surfaces at respective orientations to form a polyhedron, said polyhedron thereby appearing to be comprised of a number of faces, each of said faces comprising one of the windows, and thereby permitting a user to simultaneously view more than one of the windows.

10. The computer program product of claim 9, comprising a further computer readable program code means for causing the computer to rotate said polyhedron so that each face is visible to the user.

11. The computer program product of claim 9, comprising a further computer readable program code means for causing the computer to rotate said polyhedron under user control.

12. The computer program product of claim 9, comprising a further computer readable program code means for causing the computer to cause at least one of the windows to be translucent.

13. The computer program product of claim 9, comprising a further computer readable program code means for causing the computer to cause at least one of the windows to be scrollable.

14. A method for displaying a plurality of graphical user interface (GUI) windows simultaneously, comprising the steps of:
- (a) texture mapping the windows to a number of polygonal surfaces; and
- (b) displaying said texture mapped polygonal surfaces at respective orientations to form a polyhedron, said polyhedron thereby appearing to be comprised of a number of faces, each of said faces comprising one of the windows, and thereby permitting a user to simultaneously view more than one of the windows.

15. The method of claim 14, further comprising the step of rotating said polyhedron so that each face is visible to the user.

16. The method of claim 14, further comprising the step of rotating said polyhedron under user control.

17. The method of claim 14, wherein at least one of the windows is translucent.

18. The method of claim 14, wherein at least one of the windows is scrollable.

* * * * *